United States Patent [19]

Hilfman

[11] 3,928,180

[45] Dec. 23, 1975

[54] HYDRODESULFURIZATION WITH A CATALYST CONTAINING ALUMINA DERIVED FROM ALUMINUM SULFATE AND ALUMINUM CHLORIDE HYDROSOL

[75] Inventor: Lee Hilfman, Mt. Prospect, Ill.

[73] Assignee: Universal Oil Products Company, Des Plaines, Ill.

[22] Filed: Dec. 16, 1974

[21] Appl. No.: 533,091

Related U.S. Application Data

[63] Continuation-in-part of Ser. No. 341,441, March 15, 1973, abandoned.

[52] U.S. Cl. .............................. 208/216; 252/465
[51] Int. Cl.² ........................................ C10G 23/02
[58] Field of Search ................................ 208/216

[56] References Cited
UNITED STATES PATENTS

| | | | |
|---|---|---|---|
| 2,799,661 | 7/1957 | de Rosset | 208/216 |
| 3,169,827 | 2/1965 | de Rosset | 208/216 |
| 3,530,066 | 9/1970 | Kuwata et al. | 208/216 |
| 3,873,470 | 3/1975 | Conway et al. | 208/216 |

Primary Examiner—Delbert E. Gantz
Assistant Examiner—G. J. Crasanakis
Attorney, Agent, or Firm—James R. Hoatson, Jr.; Robert W. Welch; William H. Page, II

[57] ABSTRACT

Sulfur-containing petroleum hydrocarbon fractions are treated at hydrodesulfurization reaction conditions in contact with a catalytic composite of a Group VIII metal or metal oxide, a Group VIB metal or metal oxide, and an alumina support or carrier material. The alumina carrier material is characterized by a method of preparation which results in improved hydrodesulfurization activity of the catalytic composite. The carrier material is formed by the gelation of a hydrosol prepared by dissolving a basic aluminum sulfate in an aluminum chloride hydrosol.

9 Claims, No Drawings

HYDRODESULFURIZATION WITH A CATALYST CONTAINING ALUMINA DERIVED FROM ALUMINUM SULFATE AND ALUMINUM CHLORIDE HYDROSOL

CROSS REFERENCE TO RELATED APPLICATIONS

This application is a continuation-in-part application of a copending application Ser. No. 341,441, filed March 15, 1973 and now abandoned.

This invention relates to the catalytic hydrodesulfurization of petroleum hydrocarbon fractions such as residual fuel oils. It has become well known that oxides of sulfur, plus lesser amounts of other sulfurous compounds, are among the major pollutants of the atmosphere. It has been estimated that, in this country alone in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitable sulfur content is entirely inadequate to meet present day requirements and it becomes increasingly important to develop improved hydrodesulfurization techniques to treat the more accessible and abundant residual fuel oils of relatively high sulfur content.

Although the process of the present invention is primarily directed to the hydrodesulfurization of a sulfur-containing petroleum hydrocarbon fraction, the inherent hydrogenating function of the catalytic composite employed herein is also of advantage in the preparation of substantially saturated petroleum fractions for use or for further processing. The petroleum hydrocarbon fractions subject to hydrodesulfurization in accordance with the present invention include gasoline, naphtha, kerosine, light and heavy fuel oils, gas oils including atmospheric and vacuum gas oils, and the like.

Desulfurization technology is presently concerned with hydrotreating and to the development of catalysts that are more selective and/or operate at less severe conditions to obviate hydrocracking of the residual fuel oil. Hydrotreating or hydrodesulfurization is generally effected at hydrodesulfurization reaction conditions including an imposed hydrogen pressure of from about 100 to about 3000 pounds per square inch. Normally, the hydrogen is charged together with recycle hydrogen to provide from about 1000 to about 50,000 standard cubic feet per barrel of hydrocarbon charge. Hydrodesulfurization reaction conditions further include an elevated temperature, usually from about 95° to about 425° C. although temperatures in the higher range, say from about 315° to about 425° C., are most suitable. Also, a sulfur-containing feed stock is generally suitably processed at a liquid hourly spaced velocity of from about 0.5 to about 20. Hydrodesulfurization catalysts preferably comprise a Group VIB metal, usually molybdenum, and a Group VIII metal, usually nickel and/or cobalt, on a refractory inorganic oxide carrier material, usually alumina.

It is an object of this invention to present an improved hydrodesulfurization process utilizing a catalytic composite of a Group VIB metal or metal oxide, a Group VIII metal or metal oxide, and an alumina support or carrier material.

In one of its broad aspects, the present invention embodies a process for desulfurizing a sulfur-containing petroleum hydrocarbon fraction which comprises passing said petroleum fraction and hydrogen in contact with a catalytic composite at hydrodesulfurization reaction conditions, said catalytic composite comprising from about 5 to about 20 wt. % Group VIB metal or metal oxide and from about 0.1 to about 10 wt. % Group VIII metal or metal oxide on an alumina carrier material, said carrier material having been prepared by (a) commingling aluminum sulfate and ammonium hydroxide in aqueous solution at a pH of from about 5.5 to about 6.5 and precipitating a basic aluminium sulfate; (b) dissolving said basic aluminum sulfate in an aluminum chloride hydrosol having an aluminum/chloride ratio of from about 0.9:1 to about 1.4:1; (c) commingling urea and hexamethylenetetramine with the resulting hydrosol and dispersing the mixture as droplets in a hot oil bath; (d) aging the resulting hydrogel spheres at a temperature effecting decomposition of the residual urea and hexamethylenetetramine, and washing, drying and calcining the aged spheres.

Other objects and embodiments of this invention will become apparent in the following detailed specification.

The catalytic composite of this invention comprises a Group VIB and a Group VIII metal or metal oxide deposited on an alumina support or carrier material. The improved hydrodesulfurization activity of the catalytic composite is primarily the result of the combination of said Group VIB metal or metal oxide and said Group VIII metal or metal oxide with an alumina carrier material prepared substantially in accordance with the method of manufacture set out in U.S. Pat. No. 3,027,234.

Briefly, in the preparation of the alumina support or carrier material, a basic aluminum sulfate is dissolved in an aluminum chloride hydrosol and the resulting alumina hydrosol formed into spheroidal gel particles utilizing one or more variations of the well-known oil drop method. The basic aluminum sulfate employed is prepared by commingling aluminum sulfate in ammonium hydroxide in aqueous solution at a pH of from about 5.5 to about 6.5. The basic aluminum sulfate which precipitates at the described pH conditions can be represented by the formula $Al_2O_3(SO_3)0.5-0.45$. The basic aluminum sulfate herein contemplated is thus characterized by a $SO_3/Al_2O_3$ mole ratio of from about 0.5 to about 0.45.

One method suitable for commingling the aluminium sulfate and ammonium hydroxide in aqueous solution is to charge aluminum sulfate and ammonium hydroxide solutions separately and simultaneously to a common reaction vessel in a ratio to maintain the pH of the resulting common solution at from about 5.5 to about 6.5. The reaction vessel should embody means for controlling the individual charge rates, and also adequate mixing means and means for continuously monitoring the pH of the stirred solution or mixture. The aluminum sulfate and ammonium hydroxide solutions are readily metered to the reaction vessel in concentrations ranging from 15 to about 30%, although other concentrations can be utilized.

The aluminum chloride hydrosol, variously referred to as an aluminum oxychloride hydrosol, aluminum hydroxychloride hydrosol, and the like, is such as is prepared by the general method whereby aluminum chloride is hydrolyzed in aqueous solution and the chloride anion cncentration of the solution subsequently substantially reduced, as by neutralization, to promote olation and formation of inorganic polymers of colloidal dimension dispersed and suspended in the remaining liquid. A particularly suitable method of preparation involves the use of aluminum metal as a neutralizing agent in conjunction with an aqueous aluminum chloride solution. In this instance, the salt of neutralization is itself a hydrolyzable aluminum salt subject to ultimate sol formation. One convenient and preferred method of preparing the aluminum chloride hydrosol comprises digesting aluminum pellets in aqueous hydrochloric acid at about reflux temperature — usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared to contain aluminum and chloride in a ratio of from about 0.9:1 to about 1.4:1.

The alumina carrier material of this invention can be prepared to contain up to about 75 wt. % alumina derived from the described basic aluminum sulfate. The alumina carrier material will suitably contain from about 25 to about 75 wt. % alumina derived from said basic aluminum sulfate. Accordingly, the amount of basic aluminum sulfate dissolved in the aluminum chloride hydrosol should be sufficient to provide from about 25 to about 75 wt. % of the aluminum content, and consequently from about 25 to about 75 wt. % of the alumina content, of the ultimate alumina product. For example, in preparation of an alumina support or carrier material to contain 60 wt. % of basic aluminum sulfate-derived alumina, sufficient basic aluminum sulfate should be dissolved in the aluminum chloride hydrosol to provide an alumina hydrosol wherein 60 wt. % of the aluminum content is derived from the basic aluminum sulfate. Upon subsequent gelation of the alumina hydrosol and calcination, an alumina product is recovered, 60 wt. % of which is basic aluminum sulfate-derived and 40 wt. % of which is derived from the aluminum chloride hydrosol. The basic aluminum sulfate is suitably dissolved in the aluminum chloride hydrosol at a temperature of from about 50° to about 150° C. with a temperature in the upper range of from about 80° to about 150° C. being preferred.

Pursuant to the present invention, the aluminum chloride-sulfate hydrosol thus prepared is cooled, preferably to about room temperature, commingled with urea and hexamethylenetetramine, and dispersed as droplets in a hot oil bath whereby gelation occurs with the formation of firm spheroidal hydrogel particles. It is a primary function of the urea to stabilize the hydrosol and obviate premature gelation, particularly upon the addition of hexamethylenetetramine thereto, and the urea-hexamethylenetetramine combination subsequently serves as an ammonia precursor to facilitate neutralization and setting of the hydrosol on being dispersed as droplets in the oil bath at a temperature effecting hydrolysis and/or decomposition of the urea and hexamethylenetetramine, suitably at a temperature of from about 50° to about 105° C. The urea may be added as an aqueous solution to the basic aluminum sulfate prior to being dissolved in the aluminum chloride hydrosol, with the hexamethylenetetramine being subsequently added as an aqueous solution to the resulting hydrosol, or the urea may be added to said hydrosol in common solution with the hexamethylenetetramine to perform substantially the same function. In any case, the urea is suitably effective in from about a 1:1 to about a 5:1 mole ratio with the hexamethylenetetramine, the optimum ratio increasing in the range of from about 1:1 to about 5:1 with increasing amounts of basic aluminum sulfate employed. The spheroidal particles are typically retained and aged in the hot oil bath or forming oil whereby desirable pore characteristics of the spheroidal gel product are established. Only a fraction of the urea-hexamethylenetetramine is hydrolyzed or decomposed in the relatively short period during which initial gelation occurs with the formation of spheroidal hydrogel particles. During the subsequent aging process, the residual urea and hexamethylenetetramine retained in the hydrogel particles continues to hydrolyze and effect further polymerization of the alumina hydrogel whereby improved desirable pore characteristics are established. The urea-hexamethylenetetramine combination is utilized in an amount to provide, upon total hydrolysis and/or decompositions to ammonia, from about 110 to about 200% neutralization of the chloride and sulfate acid anion content of the hydrosol. Aging of the hydrogel is suitably accomplished over a period of from about 10 to about 24 hours, preferably in the oil suspending medium at a temperature of from about 60° to about 105° C. or more, and at a pressure to maintain the water content of the hydrogel spheres in a substantially liquid phase.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres are dried at a temperature of from about 95° to about 315° C. or dried at this temperature and calcined at a temperature of from about 325° to about 750° C. for 2–12 hours or more in an ozidizing atmosphere, and then utilized as a support or carrier material for the Group VIB and Group VIII metal components as herein contemplated.

The catalytic composite of this invention comprises a metal or an oxide of a metal of Group VIB and a metal or an oxide of a metal of Group VIII composited with the described alumina carrier material. Thus, the catalytic composite may comprise chromium, molybdenum, and/or tungsten in combination with one or more metals of Group VIII, i.e., iron, nickel, cobalt, platinum, palladium, ruthenium, rhodium, osmium and iridium in the reduced or oxidized form. Of the Group VIB metals, molybdenum is preferred. The Group VIB metal or metal oxide is suitably employed in an amount to comprise from about 5 to about 20 wt. % of the final catalytic composite. The Group VIII metal or metal oxide, which preferably comprises nickel, or nickel in combination with cobalt, is suitably effective in amounts to comprise from about 0.1 to about 10 wt. % of the final catalytic composite. The Group VIB and the Group VIII metal or metal oxide may be composited with the carrier material in any suitable manner.

For example, the alumina carrier material can be soaked, dipped, suspended or otherwise immersed in a common solution comprising a suitable compound of a Group VIB metal and a suitable Group VIII metal compound. Alternatively, a Group VIB and a Group VIII metal may be composited with the carrier material utilizing individual solutions thereof and in any convenient sequence. Suitable compounds of Group VIB metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric chloride, ferric nitrate, ferric sulfate, ferric formate, ferric acetate, platinum chloride, chloroplatinic acid, chloropalladic acid, palladium chloride, etc.

The final composite, after all of the catalytic components are present therein, is usually dried for a period of from about 2 to about 8 hours or more in a steam dryer, then at from about 100° to about 460° C. in a drying oven. The dried catalyst composite is thereafter oxidized in an oxygen-containing atmosphere, such as air, for a period of from about 1 to about 8 hours or more and at a temperature of from about 370° to about 650° C. whereby the Group VIB and Group VIII components are converted, at least in part, to their respective oxides.

The following examples are presented in illustration of the present invention and are not intended as an undue limitation on the generally broad scope of the invention as set out in the appended claims.

EXAMPLE I

An aluminum chloride hydrosol was prepared by charging 20 grams of aluminum pellets to a digester followed by 86.5 grams of treated water, and thereafter by the slow addition of 41.6 grams of concentrated hydrochloric acid. The reaction mixture was stirred at 102° C. until the aluminum digestion was substantially complete as evidenced by the evolution of approximately 2.2 grams of hydrogen. The resulting aluminum chloride hydrosol contained 13.75 wt. % aluminum in a 1.3:1 weight ratio with the chloride content thereof.

The aluminum chloride hydrosol thus prepared was admixed with 57 grams of a 28% aqueous hexamethylenetetramine solution, the mixture being maintained at about 6°–7° C. The mixture was emitted as droplets into a gas oil suspending medium maintained at 90° C. with the formation of spheroidal hydrogel particles. The spheroidal gel particles were aged for about 20 hours in the hot gas oil and thereafter washed, dried and calcined for about 1 hour at 345° C. and 2 hours at 675° C.

The calcined alumina spheres were impregnated with 3.6 wt. % nickel, 0.18 wt. % cobalt, and 7.35 wt. % molybdenum. Impregnation was by means of an impregnating solution prepared by dissolving nickel nitrate hexahydrate, molybdic acid and cobalt carbonate in a common aqueous, ammoniacal solution. The alumina spheres were immersed in the impregnating solution and soaked for about 10 minutes at ambient temperature. The solution was thereafter evaporated to dryness in contact with the spheres utilizing a rotary steam dryer. The impregnated spheres were subsequently dried at about 125° C. and calcined in air for 1 hour at 590° C. The catalyst thus prepared is referred hereinafter as Catalyst A.

EXAMPLE II

About 3 milliliters of a 28% aqueous aluminum sulfate solution was added to 50 milliliters of water in a vessel and the pH adjusted to 6 by the addition of a 28% aqueous ammonium hydroxide solution. Then the aqueous aluminum sulfate and ammonium hydroxide solutions were added similtaneously and continuously to the stirred reaction mixture in a ratio and at a rate to maintain the pH of the reaction mixture at 6, the aluminum sulfate solution being added at about 1200 milliliters per hour and the ammonium hydroxide solution at about 400 milliliters per hour until 2 gallons of the aluminum sulfate had been added. The resulting basic aluminum sulfate was separated by filtration and slurried in water to a total weight of about 7000 grams. Approximately 455 grams of the basic aluminum sulfate containing 20 grams of aluminum was then dissolved in an aluminum chloride hydrosol at 120° C., the aluminum chloride hydrosol being substantially as described in Example I.

The resulting aluminum chloride-sulfate hydrosol was cooled to 6°–7° C. and admixed with an equal volume of an aqueous solution containing 37 grams urea and 11 grams hexamethylenetetramine. Alumina hydrogel spheres were formed by the described oil drop method, aged for about 20 hours in the hot forming oil, washed, dried and calcined in air for 1 hour at 345° C. and for 2 hours at 675° C.

The calcined alumina spheres containing 50 wt. % basic aluminum sulfate-derived alumina, were impregnated with 4.3 wt. % nickel, 0.05 wt. % cobalt and 10.8 wt. % molybdenum substantially in accordance with the method of Example I, the impregnating spheres being calcined for 1 hour in air at 590° C. The catalyst of this example is hereinafter referred to as Catalyst B.

EXAMPLE III

The catalyst of this example, hereinafter referred to as Catalyst C, was prepared substantially in accordance with the catalyst preparation of Example II except that 60 wt. % of the alumina support or carrier material was basic aluminum sulfate-derived. In addition, the catalyst contained 4.2 wt % nickel, 0.046 wt. % cobalt and 10.6 wt. % molybdenum impregnated thereon in the described manner.

EXAMPLE IV

The catalyst of this example, hereinafter referred to as Catalyst D, was again prepared substantially in accordance with the catalyst preparation of Example II except that 75 wt. % of the alumina support or carrier material was basic aluminum sulfate-derived. In addition, the catalyst contained 4.3 wt. % nickel, 0.05 wt. % cobalt, and 11.0 wt. % molybdenum impregnated thereon in the described manner.

EXAMPLE V

Each of the catalysts were similarly evaluated with respect to the hydrodesulfurization of a Farmer's Union vacuum gas oil with an API at 60° F. of 20.1 and containing 2.75 wt. % sulfur. The vacuum gas oil was passed over the catalyst at a temperature of about 370° C. under 1100 psig hydrogen pressure. The vacuum gas oil was passed in contact with the catalyst at 3 LHSV and the hydrogen, including hydrogen recycled through a caustic scrubber, was charged in admixture with the vacuum gas oil at the rate of 3000 cubic feet per barrel of hydrocarbon charge.

Catalyst D, in which 75 wt. % of the alumina support or carrier material was basic aluminum sulfate-derived, was effective to lower the sulfur level of the vacuum gas oil to 0.59 wt. %. The sulfur level was further lowered to 0.54 wt. % when the basic aluminum sulfate-derived alumina was reduced to 60 wt. % as in Catalyst C, and when the basic aluminum sulfate-derived alumina was reduced to 50 wt. % as in Catalyst B, the sulfur level of the treated vacuum gas oil was further lowered to 0.40 wt. %. However, when the basic aluminum sulfate-derived alumina was completely eliminated as in Catalyst A, the sulfur level of the treated vacuum gas oil was again at 0.59 wt. % as was the case with Catalyst B containing 75 wt. % basic aluminum sulfate-derived alumina.

The effect of the alumina support or carrier material of this invention on the improved hydrodesulfurization activity of the catalytic composite is evident with reference to the date from the above examples and set out in Table I below

TABLE I

| Catalyst | A | B | C | D |
|---|---|---|---|---|
| Alumina Base | | | | |
| BAS alumina, wt. % | 0 | 50 | 60 | 75 |
| Catalytic components | | | | |
| Ni, wt. % | 3.6 | 4.3 | 4.2 | 4.3 |
| Co, wt. % | 0.18 | 0.05 | 0.05 | 0.05 |
| Mo, wt. % | 7.35 | 10.8 | 10.6 | 11.0 |
| Product | | | | |
| S, wt. % | 0.59 | 0.40 | 0.54 | 0.59 |

Thus, a preferred embodiment of the present invention resides in a catalytic composite of from about 5 to about 20 wt. % molybdenum and from about 0.1 to about 10 wt. % Group VIII metal consisting of nickel and cobalt on an alumina carrier material, from about 25 to about 50% of which is basic aluminum sulfate-derived, said carrier material having been prepared by (a) commingling aluminum sulfate and ammonium hydroxide in aqueous solution at a pH of from about 5.5 to about 6.5 and precipitating a basic aluminum sulfate; (b) dissolving said basic aluminum sulfate in an aluminum chloride hydrosol having an aluminum/chloride weight ratio of from about 0.9:1 to about 1.4:1; (c) admixing urea and hexamethylenetetramine in a mole ratio of from about 1:1 to about 5:1 and commingling the mixture with resulting hydrosol in an amount to effect from about 110% to about 200% neutralization of the chloride-sulfate acid anion content thereof, and dispersing the mixture as droplets in a hot oil bath; (d) aging the resulting hydrogel spheres in said oil bath at a temperature of from about 60° to about 105° C. and drying and calcining the aged spheres at a temperature of from about 325° to about 750° C. in an oxidizing atmosphere.

I claim as my invention:

1. A process for desulfurizing a sulfur-containing petroleum hydrocarbon fraction which comprises passing said petroleum fraction and hydrogen in contact with a catalytic composite at hydrodesulfurization reaction conditions, said catalytic composite comprising from about 5 to about 20 wt. % Group VIB metal or metal oxide and from about 0.1 to about 10 wt. % Group VIII metal or metal oxide on an alumina carrier material, said carrier material having been prepared by:
   a. commingling aluminum sulfate and ammonium hydroxide in aqueous solution at a pH of from about 5.5 to about 6.5 to precipitate a basic aluminum sulfate;
   b. dissolving said basic aluminum sulfate in an aluminum chloride hydrosol, said hydrosol having an aluminum/chloride weight ratio of from about 0.9:1 to about 1.4:1;
   c. commingling urea and hexamethylenetetramine with the resulting hydrosol of step (b) and dispersing said misture as droplets in a hot oil bath to form hydrogel spheres;
   d. aging the resulting hydrogel spheres at a temperature effecting decomposition of the residual urea and hexamethylenetetramine, and washing, drying and calcining the aged spheres to form said carrier material.

2. The process of claim 1 futher characterized in that from about 25 to about 75 wt. % of said alumina carrier material is derived from basic aluminum sulfate.

3. The process of claim 1 further characterized in that from about 25 to about 50 wt. % of said alumina carrier material is derived from basic aluminum sulfate.

4. The process of claim 1 further characterized with respect to step (c) in that said urea and hexamethylenetetramine are employed in a mole ratio of from about 1:1 to about 5:1 and in a total amount to effect from about 110 to about 200% neutralization of the chloride and sulfate acid anion content of the hydrosol upon total decomposition.

5. The process of claim 1 further characterized with respect to step (d) in that said aged spheres are washed, dried and calcined at a temperature of from about 325° to about 750° C. in an oxidizing atmosphere.

6. The process of claim 1 further characterized in that said Group VIB metal or metal oxide is molybdenum or an oxide thereof.

7. The process of claim 1 further characterized in that said Group VIII metal or metal oxide is nickel or an oxide thereof.

8. The process of claim 1 further characterized in that said Group VIII metal or metal oxide is cobalt or an oxide thereof.

9. The process of claim 1 further characterized in that said Group VIII metal or metal oxide is nickel or an oxide thereof in combination with cobalt or an oxide thereof.

* * * * *